United States Patent [19]

Fujita et al.

[11] Patent Number: 4,893,891
[45] Date of Patent: Jan. 16, 1990

[54] OPTICAL SWITCHING DEVICE INCLUDING PIVOT BEARING MECHANISM

[75] Inventors: Masayuki Fujita; Sakashi Oyama, both of Tokyo, Japan

[73] Assignee: NEC Corporation, Japan

[21] Appl. No.: 256,634

[22] Filed: Oct. 12, 1988

[30] Foreign Application Priority Data

Oct. 15, 1987 [JP] Japan .................... 62-258377

[51] Int. Cl.[4] .............. G02B 6/36; H01H 67/02
[52] U.S. Cl. ................ 350/96.20; 350/96.16; 350/96.18; 350/96.21; 335/128
[58] Field of Search .......... 350/96.15, 96.16, 96.18, 350/96.20, 96.21, 96.22; 250/227, 229; 335/128

[56] References Cited

U.S. PATENT DOCUMENTS

| | | | |
|---|---|---|---|
| 4,304,460 | 12/1981 | Tanaka et al. | 350/96.16 |
| 4,322,126 | 3/1982 | Minowa et al. | 350/96.20 |
| 4,415,228 | 11/1983 | Stanley | 350/96.20 |
| 4,415,229 | 11/1983 | McCullough | 350/96.20 |
| 4,437,728 | 3/1984 | Ohashi | 350/96.20 |
| 4,466,302 | 8/1984 | Harris | 250/229 X |
| 4,759,597 | 7/1988 | Lemonde | 350/96.20 |

FOREIGN PATENT DOCUMENTS

| | | | |
|---|---|---|---|
| 53-135650 | 11/1978 | Japan | 350/96.20 X |
| 53-158247 | 12/1978 | Japan | 350/96.20 X |

OTHER PUBLICATIONS

Nunoshita et al., "Optical Switch for Multimode . . . " Optics Lett. vol. 4, No. 1, Jan. 1979, pp. 27–28.

Primary Examiner—William L. Sikes
Assistant Examiner—Brian M. Healy
Attorney, Agent, or Firm—Leydig, Voit & Mayer

[57] ABSTRACT

In an optical switching device, an optical medium such as a prism and a glass plate is rotatively held on a supporting member by a pivot bearing and a pivot shaft, and the optical medium is rotated, for instance, by a magnetic force so that optical paths are mechanically changed-over. For this construction, the area of the frictional contact surfaces between the pivot bearing and the pivot shaft is decreased thereby providing a stable dynamic characteristic which is maintained for a long time.

10 Claims, 7 Drawing Sheets

OPTICAL SWITCHING DEVICE INCLUDING PIVOT BEARING MECHANISM

FIELD OF THE INVENTION

The invention relates to an optical switching device by which light signal paths are mechanically changed-over.

BACKGROUND OF THE INVENTION

One of conventional optical switching devices are described in the U.S. Pat. No. 4,322,126 patented on Mar. 30, 1982. The optical switching device is connected to a plurality of input optical fibers through which input light signals are supplied thereto and a plurality of output optical fibers through which switched light signals are supplied therefrom to a next stage in an optical transmission system. Between the input and output optical fibers, there is provided a light signal switching medium of, for instance, glass plate for converting each of the input light signals into parallel light beams.

In operation, the glass plate slides vertically to light paths in accordance with the electromagnetic force induced by a driver coil so that the glass plate is positioned on the light paths in the first controlled state, and moved away therefrom in the second controlled state. In the above shift of the glass plate, the light paths are changed-over between the input and output optical fibers.

A further conventional optical switching device is described in Japanese Utility Model laid-open No. 53-158247 laid open on Dec. 12, 1978. The optical switching device comprises a glass plate provided between one input optical fiber and a plurality of output optical fibers. The glass plate has light input and output surfaces parallel to each other wherein the light output surface is of a stair-like configuration for providing a plurality of light output planes, while the light input surface is of a single light input plane.

In operation, the glass plate is inserted between the input optical fiber and the plurality of output optical fibers in a posture that the light input plane and the light output planes are on the slant in regard to light paths. In this situation, an input light signal supplied from the input optical fiber is incident to the light input plane of the glass late, and then radiated from one of the light output planes which corresponds to one of the output optical fibers. As a result, the corresponding optical fiber is optically connected through the glass plate to the input optical fiber so that a light path is changed-over.

A still further conventional optical switching device is described in Japanese Patent laid-open No. 53-135650 laid open on Nov. 27, 1978. The optical switching device comprises at least one input optical fiber held in a first rotary holder and a plurality of output optical fibers held in a second rotary holder. The first and second rotary holders are in contact on respective flat planes with each other and rotated on a common axis.

In operation, the input optical fiber is optically connected to an output optical fiber selected from the plurality of output optical fibers in accordance with a relative rotation of the first and second holders. As a result, a light signal supplied from the input optical fiber is switched to the selected output optical fiber.

According to the first and second conventional optical switching devices, however, there are disadvantages that a stable motion of the glass plate is not maintained for a long time because a sliding friction of a mount supporting for the glass plate thereon is largely varied in a sliding groove depending upon the surface condition of the sliding groove, and that the stopped position of the glass plate is minutely varied in the aforementioned first controlled state thereby resulting in the fluctuation of the insertion loss and the deterioration of the reproducibility in changing-over the light paths because the formation of a gap is inevitable between the mount and the sliding groove.

According to the third conventional optical switching device, however, there is a disadvantage that it becomes large and complicated in its construction because a ball and roller bearing must be adopted in a practical use.

SUMMARY OF THE INVENTION

Accordingly, it is an object of the invention to provide an optical switching device in which a stable operation is maintained for a long time.

It is a further object of the invention to provide an optical switching device in which the fluctuation of the insertion loss and the deterioration of the reproducibility are avoided in changing-over the light paths.

It is a still further object of the invention to provide an optical switching device, the size and the construction of which are compact and simple.

According to the invention, an optical switching device comprises an optical medium which operates mechanically for changing over light paths in accordance with an externally actuating force. The optical medium is supported on a mount by pivot bearings so that the optical medium is rotated stably whereby a light signal is switched between input and output optical fibers.

BRIEF DESCRIPTION OF DRAWINGS

The invention will be described in more detail in conjunction with appended drawings wherein.

DESCRIPTION OF PREFERRED EMBODIMENTS

Figure 1:
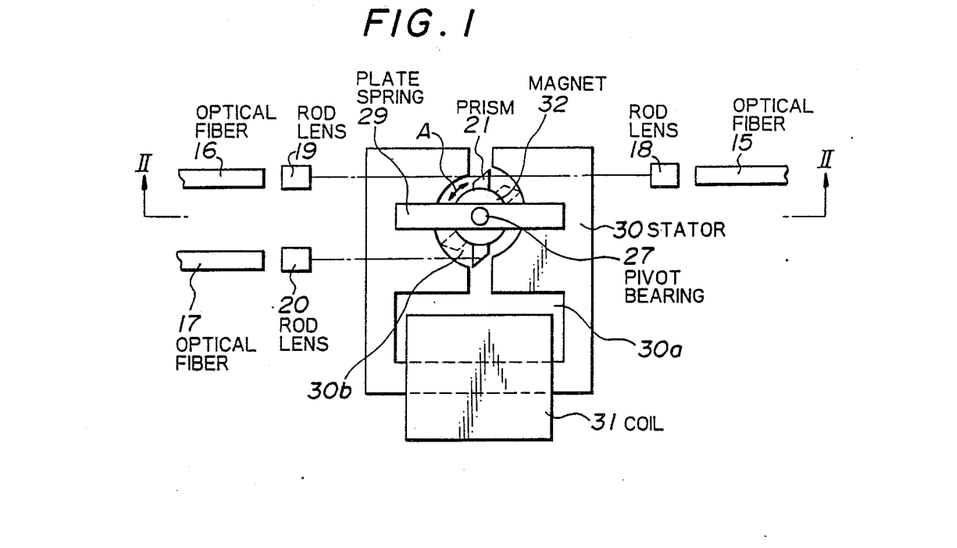
FIG. 1 is a plane view showing an optical switching device in a first embodiment according to the invention.
Figure 2:
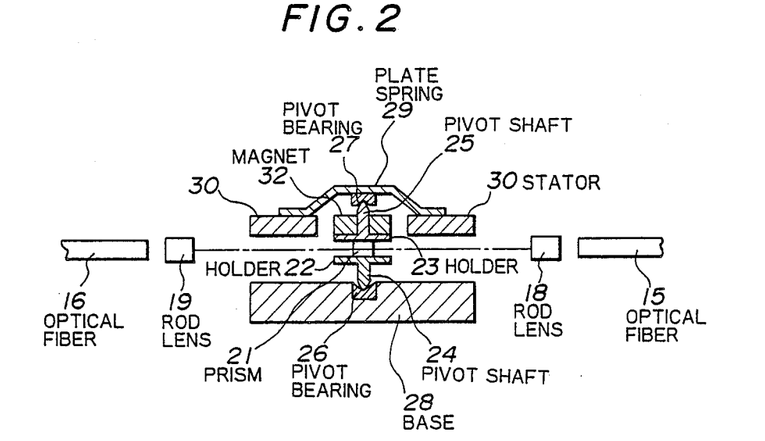
FIG. 2 is a cross sectional view taken along a line II—II in FIG. 1.

In FIGS. 1 and 2, there is shown the optical switching device in the first embodiment wherein multi-mode optical fibers 15 and 16 each having a core diameter of 50 μm are arranged on a common axis, and a multi-mode optical fiber 17 having the same core size as the optical fibers 15 and 16 is arranged parallel to the optical fiber 16. Optically coupled to the end of the optical fibers 15, 16 and 17, rod lenses 18, 19 and 20 are correspondingly positioned to focus input and output light signals. On light paths defined by light axes of the optical fibers 15, 16 and 17, a parallelogram prism 21 which is sandwiched by disk-like holders 22 and 23 is provided. The prism 21 is rotatively held in accordance with the combinations of a pivot shaft 24 and a lower pivot bearing 26, and a pivot shaft 25 and an upper pivot bearing 27. The lower pivot bearing 26 is mounted on a fixed base 28 (stainless steel), and the upper pivot bearing 27 is forced downward resiliently by a plate spring 29 which is fixed on a magnetic plate (a stator) 30. The magnetic plate 30 is provided with a split portion 30a through which a driver coil 31 is wound thereon, and is also provided with a circular cut portion 30b which is not symmetrical. In the circular cut portion 30b, a circular magnet 32 is fixed on the holder 23 to face the magnetic plate 30 thereby providing a single phase step motor.

Figure 3:
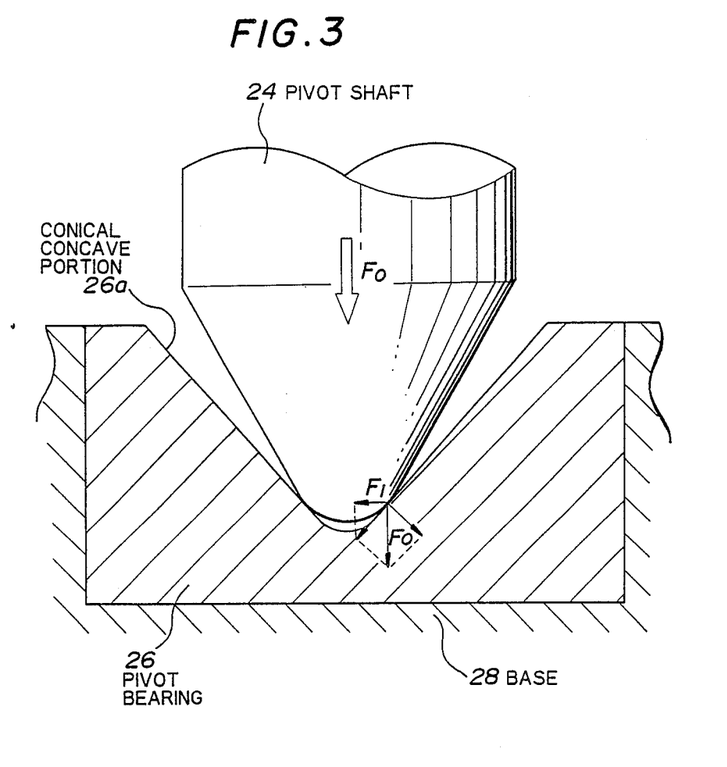
FIG. 3 is a partial enlarged cross sectional view showing a pivot bearing in the optical switching device shown in FIGS. 1 and 2, FIGS. 4A and 4B are explanatory diagrams showing operation of the optical switching device in the first embodiment.

FIG. 3 shows the lower pivot bearing 26 and the pivot shaft 24 already explained in FIGS. 1 and 2 which are the same as the upper bearing 27 and the pivot shaft 25. The tip portion of the pivot shaft 24 is of a spherical shape having a radius of 0.2 mm provided on a conical shape having an apex angle of 60° (sixty degrees). On the other hand, the lower pivot bearing 26 is provided with a conical concave portion 26a having an apex angle of 85° (eighty-five degrees). Thus, an axis of the pivot shaft 24 coincides with that of the conical concave portion 26a, such that circular contact surfaces having a radius of less than 0.1 mm and a center exactly positioned on the axis are obtained therebetween.

Figure 4A:
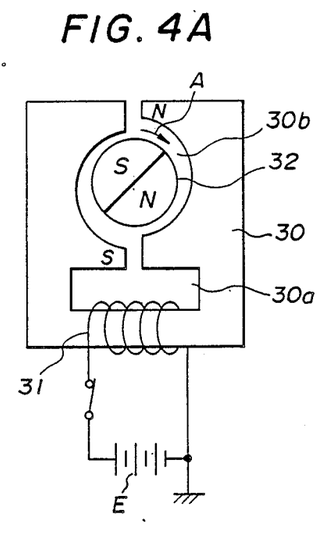
Figure 4B:
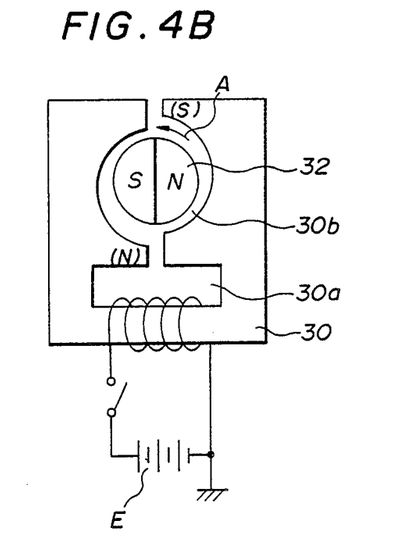

In operation, when the driver coil 31 is energized from a power supply E as shown in FIG. 4A, magnetic poles are induced in the magnetic plate 30 as shown by "N" and "S" so that a rotor consisting of the circular magnet 32 having N and S poles, the holders 22 and 23 and the prism 21 is rotated on the pivot shafts 24 and 25 in accordance with the magnetic replusive force as indicated by an arrow A. When the driver coil 31 is turned off as shown in FIG. 4B, the magnetic plate 30 is magnetized by the magnet 32 as shown by "(N)" and "(S)" so that the magnet 32 etc. are rotated in accordance with the magnetic attraction force as indicated by an arrow A. In a case where the prism 21 is on a solid line position in FIG. 1, the optical fibers 15 and 17 are optically connected through the rod lens 18, the prism 21, and the rod lens 20. On the other hand, the optical fibers 15 and 16 are optically connected through the rod lenses 18 and 19 in a case where the prism 21 is on a dotted line position in FIG. 1 which is off the light paths. As clearly understood in FIGS. 4A and 4B, the circular cut portion 30b is provided with two magnetic discontinuous points defined by the asymmetrical circular configuration and the number of magnetic poles of the magnet 32.

As shown in FIG. 3, a force $F_0$ is produced downward on the contact surfaces between the pivot shaft 24 and the conical concave portion 26a by the plate spring 29. As a result, a component force $F_1$ is produced in a direction toward the axis of the pivot shaft 24 thereby avoiding an axis deviation of the pivot shaft 24.

For this reason, a stopped position of the prism 21 is controlled in a high precision, the insertion loss of the optical switching device is decreased, and the reproducibility of the switching control is improved. In fact, such satisfactory results that the switching reproducibility of the insertion loss is 0.1 dB, and that the fluctuation of a rotating torque is less than 6% after the exposure of the optical switching device to corrosive gas atmosphere for 20 hours are obtained.

Even more, no dust enters between the contact surfaces of the pivot shaft 24 and the pivot bearing 26 because no gap exists therebetween. For this reason, a stable rotary motion of the prism 21 is expected even if a surrounding atmosphere is not so good.

Next, there is shown the optical switching device in the second embodiment in FIGS. 5 to 8 wherein like parts are indicated by like reference numerals in FIGS. 1 to 3. In the second embodiment, there are the following differences from the first embodiment. That is, a plate 29 having a pivot shaft 25 is provided in place of the plate spring 29, a magnet 32 is provided with a pivot bearing 27 in place of the pivot shaft 25, and optical fibers 15A and 15B and rod lenses 18A and 18B are provided in place of the optical fiber 15 and the rod lens 18. In addition, a base 28 is illustrated as having stopper 28A which engages with cut walls 22A and 22B of a holder 22 and pins 28B passing through apertures 29B of the plate 29 and apertures 30B of a magnet plate (a stator) 30. The magnet plate 30 is provided with a split portion 30a and a circular cut portion 30b having two splits 30c, and a magnet coil 31 wound through the split portion 30a on the magnet plate 30 is illustrated as having lead wires 31A connected to a power supply E (FIGS. 9A and 9B).

Figure 5:
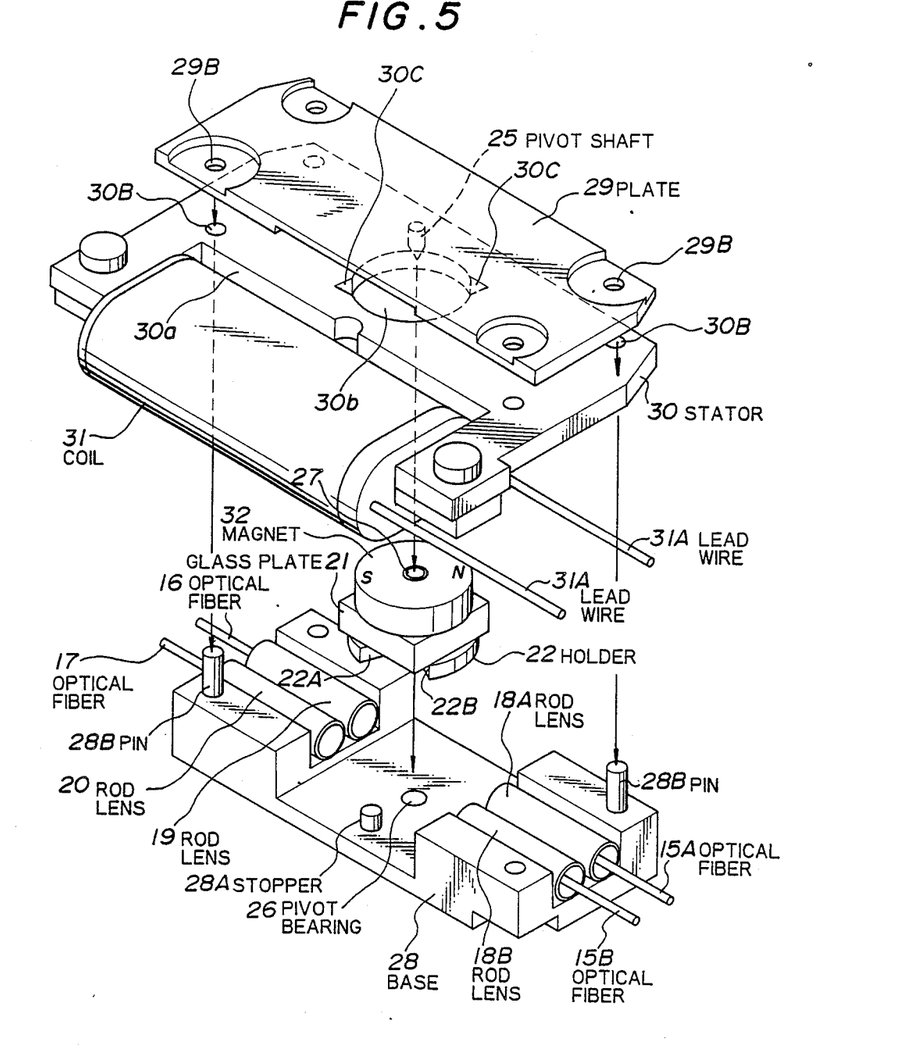
FIG. 5 is an explanatory view showing parts which are disassembled in an optical switching device in a second embodiment according to the invention.
Figure 6:
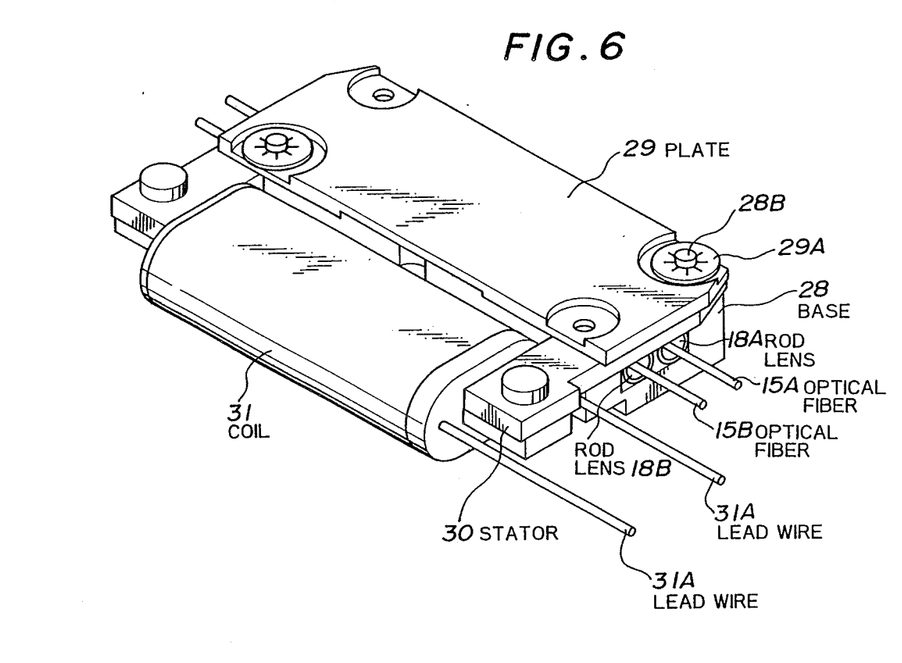
FIG. 6 is a perspective view showing the optical switching device in the second embodiment.
Figure 7:
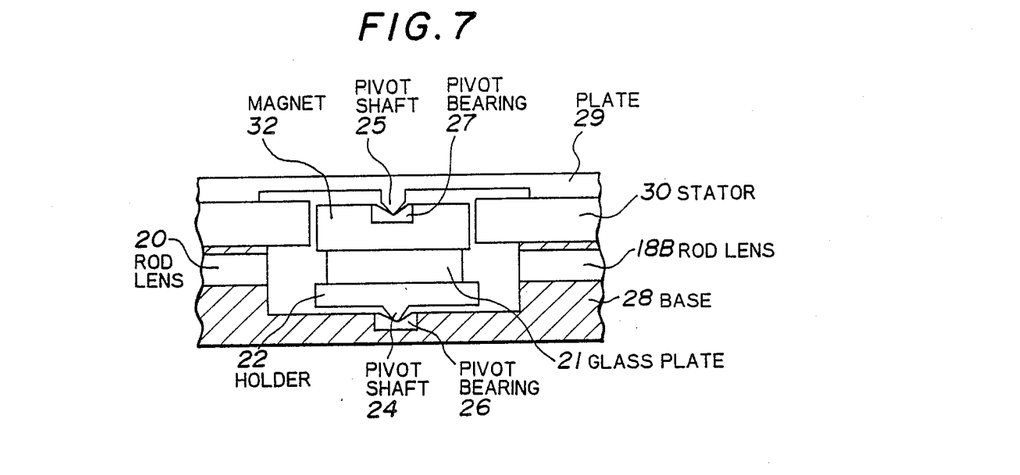
FIG. 7 is a partial cross sectional view showing pivot bearings in the optical switching device in the second embodiment.
Figure 8:
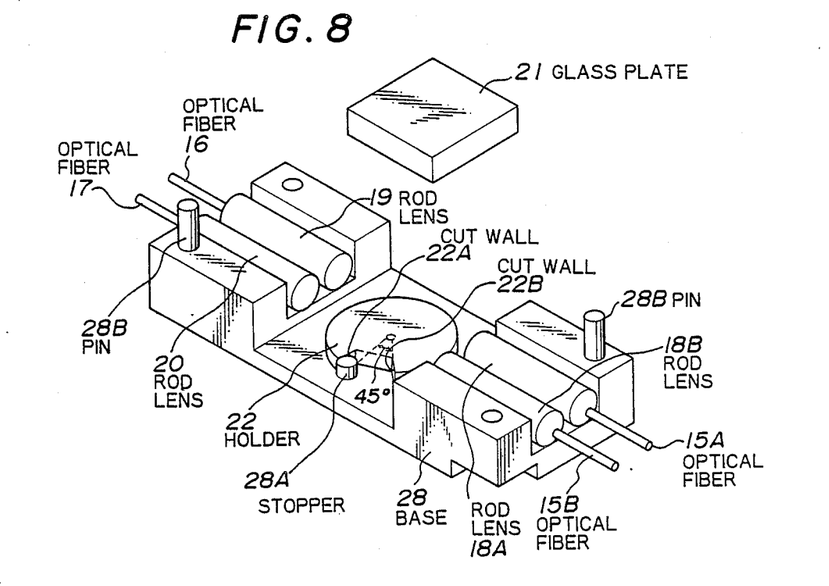
FIG. 8 is a partial explanatory view showing a glass plate and a holder for mounting the glass plate which are disassembled in the optical switching device in the second embodiment.

In assembling parts as shown in FIG. 5, the pins 28B are passed through the apertures 29B and 30B of the plate 29 and the magnet plate 30, and then fastened by lock metal members 29A as shown in FIG. 6. In the assembled optical switching device, a square glass plate 21 replacing the prism 21 in the first embodiment is held on the holder 22, and is rotatively supported by the upper and lower pivot bearings 27 and 26 receiving the pivot shafts 25 and 24 as shown in FIG. 7.

Figure 9A:
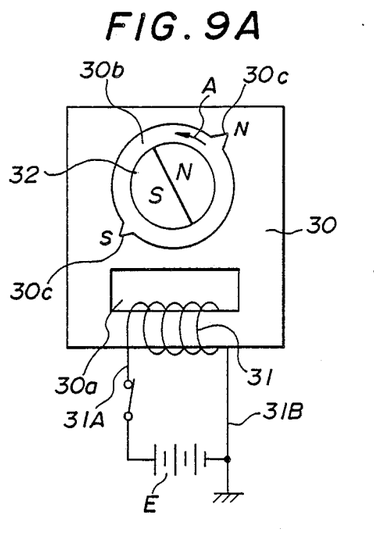
FIGS. 9A and 9B are explanatory diagrams showing operation of the optical switching device in the second embodiment.
Figure 9B:
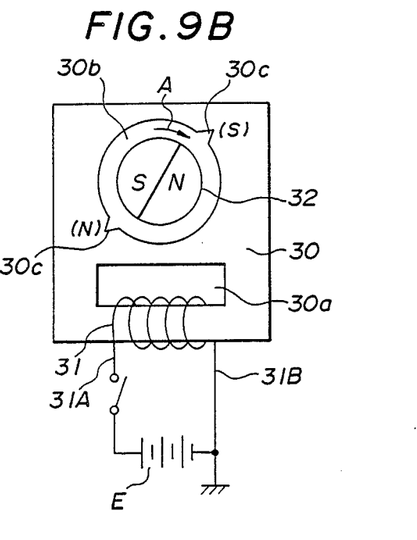
Figures 10A, 10B:
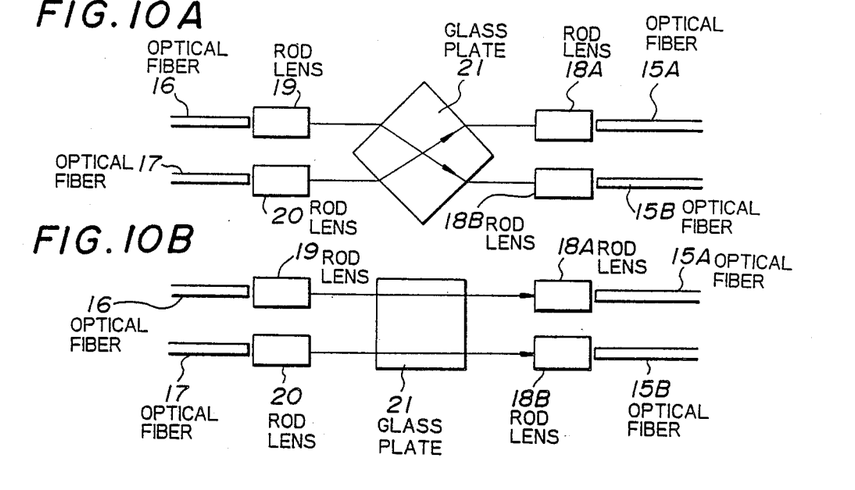
FIG. 10A and 10B are explanatory diagrams showing a light signal switching operation in the second embodiment.

In operation, when the coil 31 is turned on and off from the power supply E as shown in FIGS. 9A and 9B, the magnet 32 is rotated as shown by opposite two arrows A in the same manner as in FIGS. 4A and 4B. In accordance with this control, when the glass plate 21 takes a position as shown in FIG. 10A, that is, the holder 22 is stopped on the cut wall 22A by the stopper 28A, the optical fiber 15A is connected to the optical fiber 17, and the optical fiber 15B is connected to the optical fiber 16. On the other hand, when the glass plate 21 is rotated in the clockwise direction by fourty-five degrees, and the holder 22 is stopped on the cut wall 22B by the stopper 28, straight line light paths are obtained as shown in FIG. 10B.

Figure 11A:
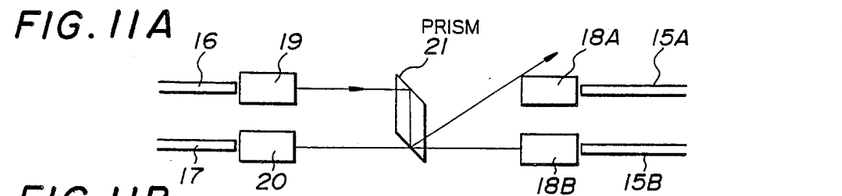
FIG. 11A and 11B are explanatory diagrams showing a further light signal switching operation in the second embodiment.
Figure 11B:
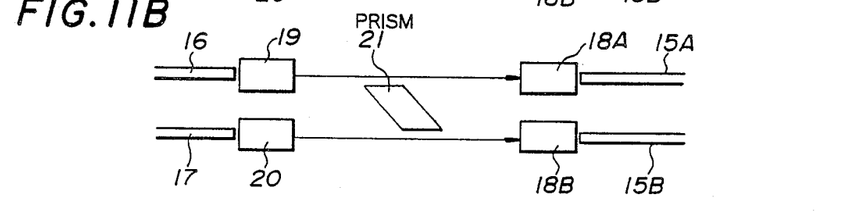

The glass plate 21 may be replaced in the second embodiment by the parallelogram prism 21 as adopted in the first embodiment. In such a case, light paths are changed-over, and light signals are switched as shown in FIGS. 11A and 11B.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An optical switching device comprising:
   an optical medium for changing-over optical paths,
   a body for supporting said optical medium,
   at least one input provided on said body,
   at least one output provided on said body, and
   a pivot bearing mechanism, wherein said optical medium is rotatively held in said body by means of said pivot bearing mechanism.

2. An optical switching device comprising:
   an optical medium for changing-over optical paths,
   a body for supporting said optical medium,
   at least one input provided on said body,
   at least one output provided on said body, and
   a pivot bearing mechanism including a pivot shaft having a spherical tip portion provided on a conical portion and a pivot bearing having a conical concave portion whereby circular contact surfaces are obtained between said pivot shaft and said pivot bearing and wherein said optical medium is rotatively held in said body by means of said pivot bearing mechanism.

3. An optical switching device comprising:
   an optical medium for changing-over optical paths, said optical medium being fixed to a magnet which serves as a rotor,
   a body for supporting said optical medium, said body including a magnetic plate which serves as a stator and on which a coil is wound,
   at least one input provided on said body,
   at least output provided on said body, and
   a pivot bearing mechanism, wherein said optical medium is rotatively held in said body by means of said pivot bearing mechanism and whereby said optical medium is rotated in accordance with the energization of said coil.

4. An optical switching device according to claim 3, wherein said magnetic plate is provided with a circular cut portion, and said magnet is circular, such that said magnet is positioned in said circular cut portion.

5. An optical switching device according to claim 4, wherein said circular cut portion is provided with magnetic discontinuous points, the number of said magnetic discontinuous points being equal to that of magentic poles of said magnet for said rotor.

6. An optical switching device according to claim 1 wherein said pivot bearing mechanism includes a pivot shaft and a pivot bearing supporting said pivot shaft.

7. An optical switching device according to claim 6 wherein said pivot shaft includes a spherical tip portion and said pivot bearing has a conical portion wherein circular contact surfaces are obtained between said pivot shaft and said pivot bearing.

8. An optical switching device according to claim 1 comprising at least two outputs provided on said body and wherein said optical medium is arranged to change-over from one output to the other.

9. An optical switching device comprising:
   a main body;
   an optical medium for changing-over optical paths;
   at least one input provided on said main body;
   at least one output provided on said main body; and
   a pivot bearing mechanism for rotatively holding said optical medium, said pivot bearing mechanism including at least one pivot shaft and at least one pivot bearing and being provided in said main body, wherein said optical medium is rotated on said at least pivot shaft to change-over said optical paths.

10. An optical switching device according to claim 9 comprising at least two outputs provided on said main body and wherein said optical medium is arranged for changing over from one output to the other.

* * * * *